United States Patent [19]

Ruprecht et al.

[11] Patent Number: 4,998,983

[45] Date of Patent: Mar. 12, 1991

[54] MANUALLY OPERATED APPARATUS FOR CONTROLLING THE BRAKE AND ACCELERATOR OF A MOTOR VEHICLE

[75] Inventors: Peter B. Ruprecht, Hopatcong; Mario Agostinelli, West Paterson, both of N.J.

[73] Assignee: Drive-Master Corp., Fairfield, N.J.

[21] Appl. No.: 360,995

[22] Filed: Jun. 2, 1989

[51] Int. Cl.⁵ .............................................. B60K 41/20
[52] U.S. Cl. .................................... 192/1.52; 74/481; 74/482
[58] Field of Search ................ 192/1.52; 74/481, 482, 74/502.6, 510, 525; 403/53, 57, 161, 162, 152; 248/168, 170, 291, 185

[56] References Cited

U.S. PATENT DOCUMENTS

| | | | |
|---|---|---|---|
| 2,253,569 | 8/1941 | Langsner | 403/152 |
| 2,776,624 | 1/1957 | Reinhard | 74/525 X |
| 2,920,911 | 1/1960 | Campagnolo | 248/185 X |
| 3,423,089 | 1/1969 | Andis | 248/185 X |

Primary Examiner—Rodney H. Bonck
Attorney, Agent, or Firm—Lerner, David, Littenberg, Krumholz & Mentlik

[57] ABSTRACT

A hand control apparatus for a motor vehicle provides for the adjustment of the braking force independently from the adjustment of the throttle force. A telescoping member actuates the brake pedal upon the downward movement of an operating arm. Upward movement of the operating arm rotates a pivot assembly to actuate the accelerator pedal. The fluid operation of the apparatus is facilitated by joint connections which are universally pivotable.

11 Claims, 4 Drawing Sheets

MANUALLY OPERATED APPARATUS FOR CONTROLLING THE BRAKE AND ACCELERATOR OF A MOTOR VEHICLE

BACKGROUND OF THE INVENTION

The present invention relates to an apparatus having a single lever arm for operating the brake and accelerator of a motor vehicle by hand.

Prior art forms of hand controls have suffered from a variety of shortcomings. Thus, U.S. Pat. Nos. 2,707,886 and 2,724,285 disclose hand control devices having a single lever to operate both the brake pedal and the accelerator of a motor vehicle. With these devices, however, once the force to be applied to the brake pedal has been set, there is no way to independently adjust the force to be applied to the accelerator. Furthermore, these devices are not readily adaptable to vehicles having tilt wheel steering columns.

U.S. Pat. No. 3,472,094 discloses a device having separate lever arms to individually control the brake pedal and the accelerator of a motor vehicle. This type of arrangement is cumbersome and more difficult to operate than a device having a single lever arm. Furthermore, there is no provision for adjusting the force to be exerted on the accelerator.

In U.S. Pat. No. 4,627,522 a device is disclosed which utilizes a single lever arm movable in two planes to control the brake and accelerator of a motor vehicle. In this device a cable assembly is tensioned in order to exert a force on the accelerator, but no means for adjusting the force required to tension the cable assembly is provided.

None of the aforementioned prior art devices disclose the ability to adjust the force applied to actuate the accelerator independently of the adjustment of the braking force. Thus, once the braking force applied by movement of the operating lever has been adjusted, there is no capability to further adjust the force required to actuate the accelerator. In other words, should one make the necessary adjustments in order to achieve a desired braking force, they have heretofore had to settle for the force exerted on the accelerator which resulted from that braking force adjustment. Independent adjustment of the force exerted on the accelerator has not been possible.

Therefore, despite the existence of the aforementioned hand control devices, there exists a need for improved devices for operating the brake and accelerator of a motor vehicle by hand, so constructed as to be easy to operate, and which allows for independent adjustment of the brake force and accelerator force.

SUMMARY OF THE INVENTION

In accordance with one aspect of the present invention, these needs have now been addressed by the invention of a hand control apparatus for operating the brake and accelerator of a motor vehicle which includes housing means for removably mounting the apparatus in assembled position on the motor vehicle; operating means having a distal end pivotally connected to the housing means and a proximate end including handle means movable in a first direction to operate the brake of the motor vehicle and movable in a second direction to release the brake and actuate the accelerator of the motor vehicle; telescoping means having a first pivotal means adjustably connectable and movable with the operating means on movement of the handle means, and a second pivotal means adjustable relative the first pivotal means for connection to the brake of the motor vehicle; lever means pivotally and adjustably connected to the housing means; accelerator actuating means having a first end pivotally connected to said lever means and a second end adjustably spaced from the first end for attachment to the accelerator of the motor vehicle; and lost motion connecting means for operative connection to the telescoping means and the lever means for operating the accelerator actuating means only when the operating means moves the telescoping means in the second direction to release the brake of the motor vehicle.

In accordance with one embodiment of the invention, the hand control apparatus further includes fulcrum bar means fixedly connected to the housing means and having a near end pivotally connected to the distal end of the operating means.

In another embodiment, the hand control apparatus may include positioning means for adjusting the transverse distance between the second pivotal means of the telescoping member and the brake of the motor vehicle.

In yet another embodiment, the operating means includes means for adjusting the connection of the first pivotal means of the telescoping means on the operating means.

In still another embodiment, the telescoping means includes collar means operatively connected to the telescoping means and longitudinally adjustable therealong and connected to the lost motion connecting means for adjusting the actuation of the accelerator of the motor vehicle upon movement of the handle means in the second direction. Additionally, the telescoping means may further include means for adjusting the length of the telescoping means in order to adjust the operation of the brake of the motor vehicle.

In yet another embodiment, the first and second pivotable means of the telescoping means includes first and second opposed wall members a spaced distance apart, the first wall member having a first bore therethrough in axial alignment with a second bore through the second wall member; an elongated boss member integrally connected at an edge of the first and second opposed wall members; and a cylindrical shaft rotatably mounted at one end in the first bore in the first wall member, and at another end in the second bore in the second wall member, the cylindrical shaft having a transverse bore therethrough at a location between the first and second wall members and sized for receiving the operating means. Desirably, the operating means includes outer thread means and the transverse bore of the first pivotable means includes inner thread means sized and shaped for engagement with the outer thread means on the operating means to enable adjustment of the connection of the first pivotal means on the operating means. In addition, the positioning means may include outer thread means and a transverse bore of the second pivotal means may include inner thread means sized and shaped for engagement with the outer thread means on the positioning means to enable adjustment of the transverse distance between the second pivotal means and the brake of the motor vehicle.

Preferably, the lever means includes means for altering the force applied to actuate the accelerator. Thus, in still another embodiment, the lever means may include a first lever arm connected at a pivot point to the housing means, and having pivotally connected at an operative end thereof the first end of the accelerator actuating means, and means for altering the distance between the pivot point and the operative end of the first lever arm in order to alter the force applied to actuate the accelerator. The lever means may also include a second lever arm connected at the pivot point to the housing means, the second lever arm having an attachment end for connection with the lost motion connecting means, the attachment end of the second lever arm being spaced from the operative end of the first lever arm so that pivotal displacement of the first and second lever arms about the pivot point results in tangential displacement of the attachment end of the second lever arm in a first vertical direction and corresponding tangential displacement of the operative end of the first lever arm in an opposite vertical direction, and means for altering the distance between the pivot point and the attachment end of the second lever arm in order to alter the force applied to actuate the accelerator. Desirably, the lost motion connecting means is formed from a length of chain.

Another aspect of the present invention provides a pivotable joint means for use on a hand control apparatus for operating the brake and accelerator of a motor vehicle which includes first and second opposed wall members a spaced distance apart, the first wall member having a first bore therethrough in axial alignment with a second bore through the second wall member; an elongated boss member integrally connected at an edge of the first and second opposed wall members; and a cylindrical shaft rotatably mounted at one end in the first bore in the first wall member, and at another end in the second bore in the second wall member, the cylindrical shaft having a transverse bore therethrough at a location between the first and second wall members.

Preferred embodiments of the present invention provide a hand control apparatus for a motor vehicle which permits the independent adjustment of the brake force and the accelerator force.

Moreover, the preferred apparatus according to the present invention provides a relatively simple structure that is easy to install and operate. The ease of operation is promoted by the use of preferred pivotable joint means in accordance with the present invention.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION

Figure 1:
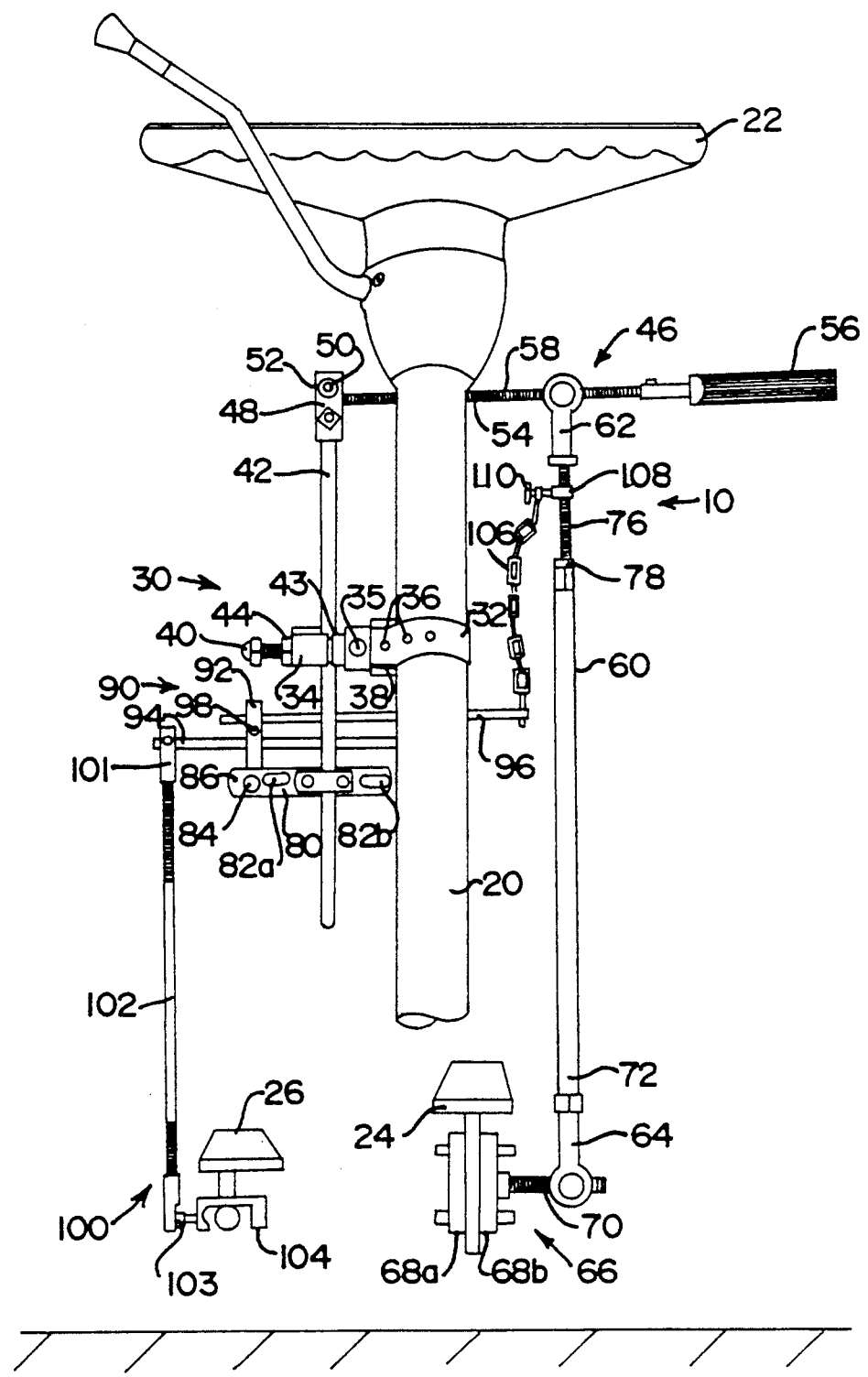
FIG. 1 is a perspective view showing the hand control apparatus in accordance with the present invention in assembled position in a motor vehicle, the hand control apparatus being in a normal, inoperative position.

Referring to FIG. 1, there is illustrated a preferred embodiment of the hand control apparatus 10 in accordance with the present invention.

Hand control apparatus 10 is fixedly assembled to the steering column 20 of a motor vehicle by housing means generally indicated as 30. Housing means 30 includes flexible strap 32 which wraps around steering column 20 and attaches at either end to the sides of mounting bracket 34 by means of bolts 35. Flexible strap 32 is typically formed from a strip of stainless steel or other similarly strong material, and includes a plurality of holes 36 at either end so that the connection of strap 32 to mounting bracket 34 may be adjusted depending upon the diameter of steering column 20. Slidably interposed between steering column 20 and mounting bracket 34 is an adjustable V-block 38 which is forced against steering column 20 by the clockwise rotation of set screw 40, thereby fixedly securing housing means 30 to the steering column 20.

Housing means 30 further includes fulcrum bar 42 which is inserted through an aperture 43 in mounting bracket 34 and fixed thereto by tightening lock nut 44. An attachment block 48 is fixedly connected to the end of fulcrum bar 42 nearest steering wheel 22, and includes bearing 50 which pivotally engages arm 52 perpendicularly formed at the end of an operating means 46.

Operating means 46 includes shaft 54 which terminates with handle 56, the vertical movement of which causes the pivoting of operating means 46 within attachment block 48, and the actuation of the brake or accelerator of the motor vehicle.

Operating means 46 is operatively connected to brake pedal 24 by telescoping means 60. At one end, first pivotal means 62, described more fully hereinafter, adjustably connects telescoping means 60 to threaded portion 58 on shaft 54. At the opposite end, second pivotal means 64, essentially the same as first pivotal means 62, is operatively attached to brake pedal 24 by means of clamp assembly 66. At one end, clamp assembly 66 includes jaw members 68a and 68b which fixedly engage brake pedal 24, and at the other end clamp assembly 66 includes threaded portion 70 which is adjustably engaged by second pivotal means 64.

Figure 3:
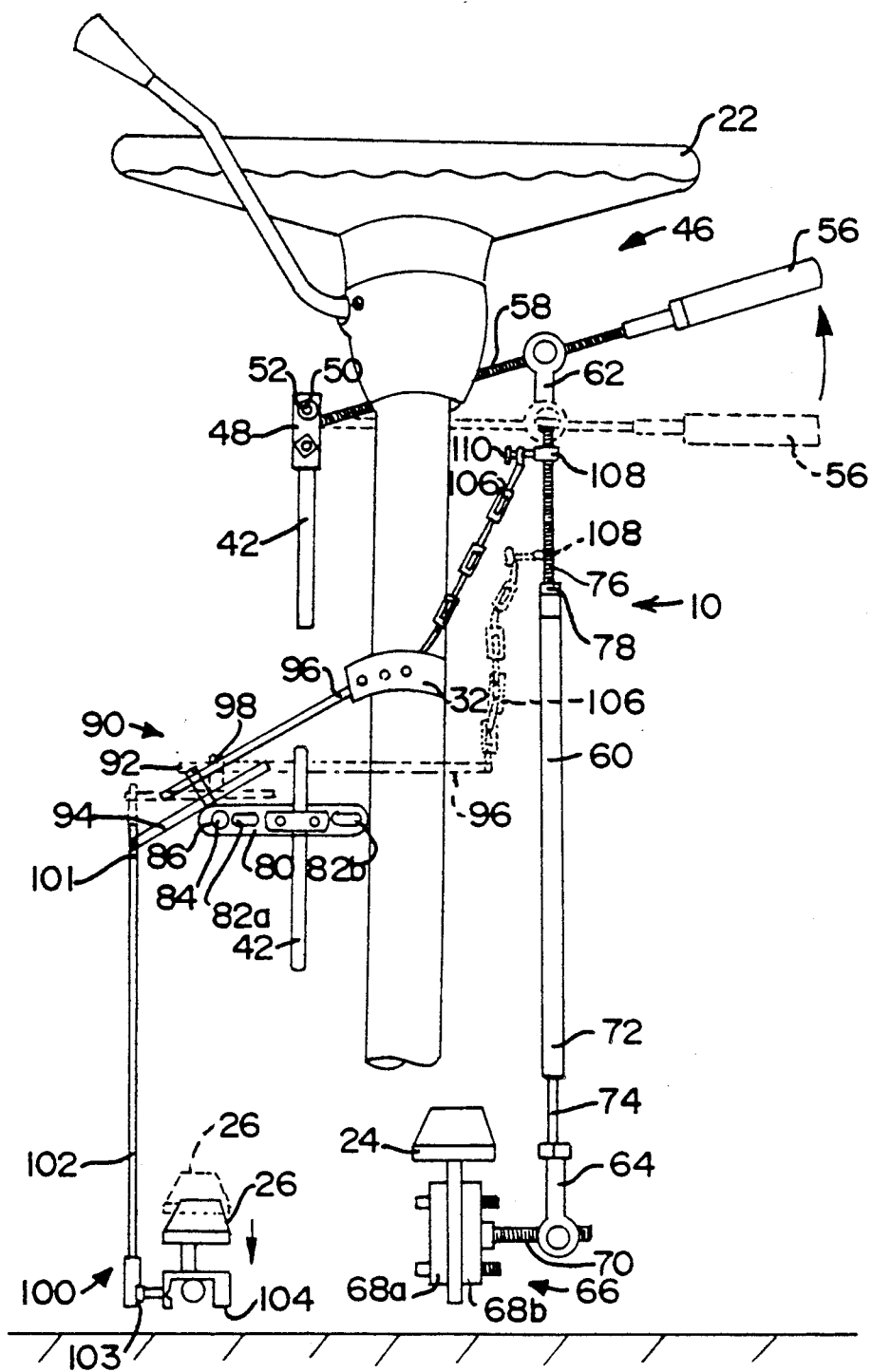
FIG. 3 is a perspective view showing the hand control apparatus of FIG. 1 in a second position releasing the brake and actuating the accelerator of the motor vehicle.

As can be seen in FIG. 3, telescoping means 60 includes shaft member 74, one end of which is fixedly connected to second pivotal means 64, and the other end of which is telescopedly received within one end of tubular sleeve 72. At its opposite end, tubular sleeve 72 is adjustably attached to first pivotal means 62 by means of threaded rod 76. Thus, the length of telescoping means 60 may be decreased or increased by further threading tubular sleeve 72 onto or off from threaded rod 76. Lock nut 78 fixes the length of telescoping means 60 once it has been adjusted.

Figure 4:
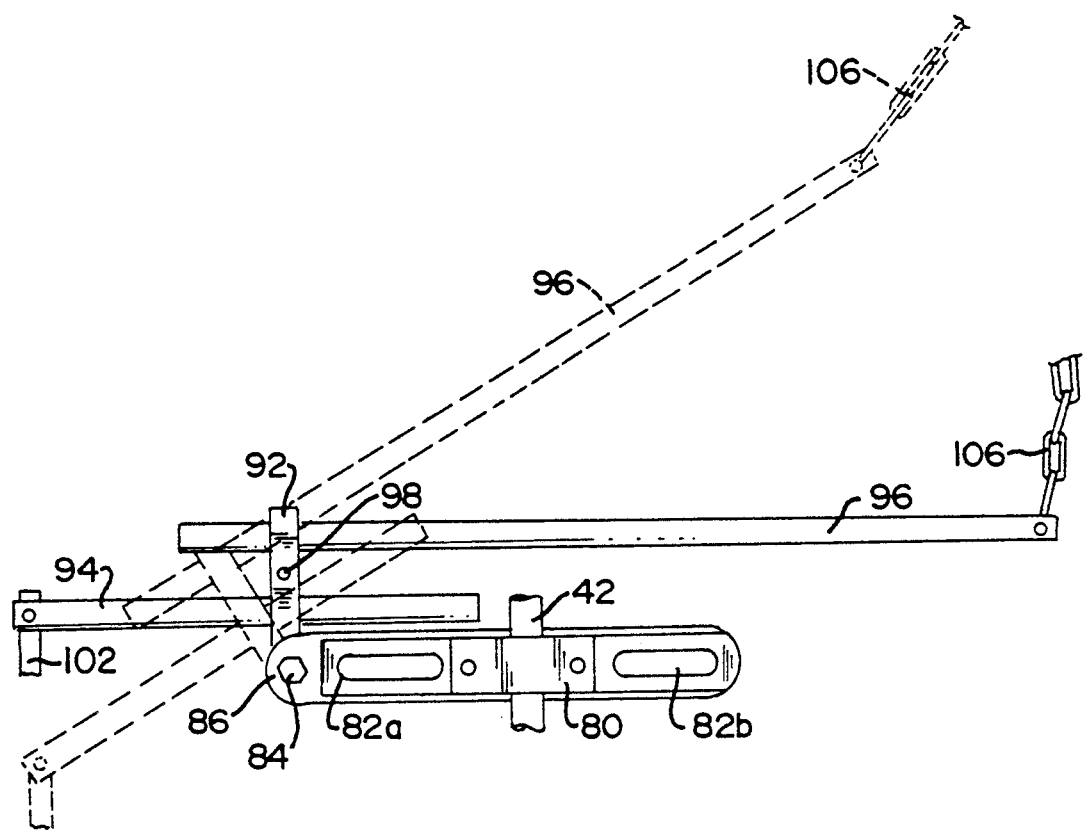
FIG. 4 is an exploded plan view of the lever means in accordance with the present invention.

At the end opposite attachment block 48, fulcrum bar 42 includes lever means 90 which is fixedly attached thereto by means of bracket assembly 80, all of which can be seen in FIG. 4. Elongated slots 82a and 82b in bracket assembly 80 permit the lateral adjustment of the bracket assembly 80 with respect to fulcrum bar 42. Lever means 90 includes lever block 92, pivotally connected to bracket assembly 80 at pivot point 84 located at the outer end 86 of bracket assembly 80. In slidable engagement with lever block 92 are first lever arm 94 and second lever arm 96, the positions of which are fixed with respect to lever block 92 by tightening bolt 98.

At the end remote from steering column 20, first lever arm 94 is pivotally engaged with accelerator actuating means 100. Accelerator actuating means 100 includes threaded rod 102 which extends from a pivotal ball and socket connection 101 with first lever arm 94 and terminates in a pivotal, ball and socket connection 103 to accelerator clamp 104, which in turn is fixedly connected to the accelerator pedal 26.

A lost motion means 106 connects second lever arm 96 to telescoping means 60. Although lost motion means 106 is indicated in the figures as a length of chain, any mechanical component may be used that is operative upon application of a force thereto in a first direction, but which is inoperative upon application of a force thereto in an opposite direction. The connection of lost motion means 106 to telescoping means 60 is provided by annular collar 108 which is slidably mounted on the threaded portion 76 of telescoping means 60. The position of annular collar 108 on threaded portion 76 is fixed by set screw 110.

As discussed above, pivotal means 62 and 64 are essentially the same and therefore the following discussion of the structure of pivotal means 62 is equally applicable to pivotal means 64.

Figures 5, 6, 7:
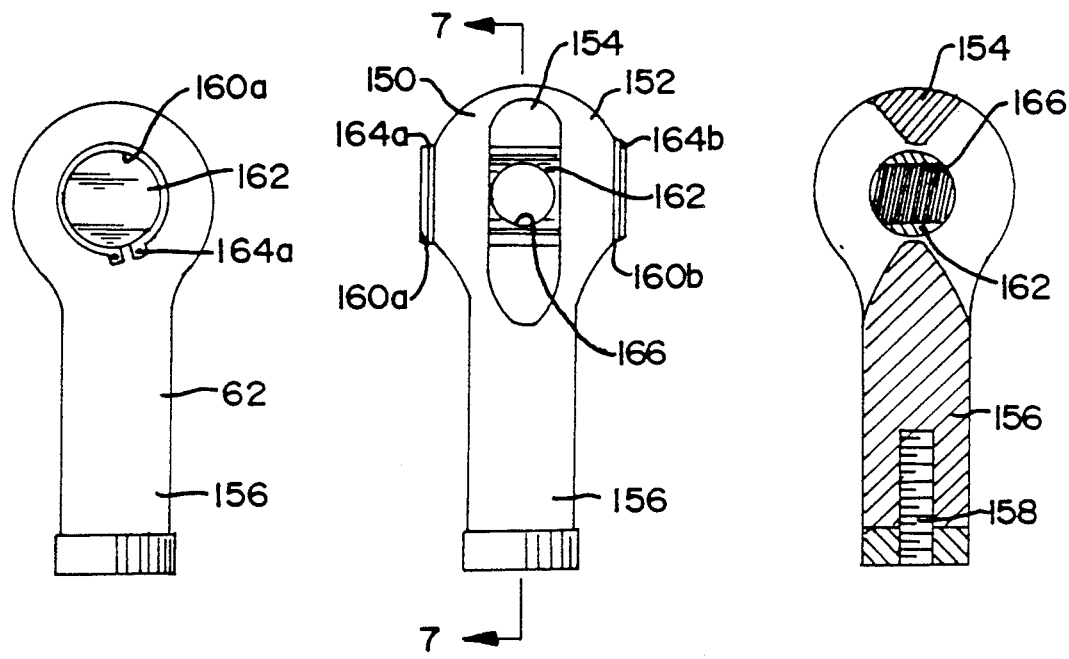
FIG. 5 is a front elevational view of the pivotable joint means in accordance with the present invention.
FIG. 6 is a side elevational view of the pivotable joint means of FIG. 5.
FIG. 7 is a cross-sectional view taken along line 7—7 of FIG. 6.

Referring to FIGS. 5, 6 and 7, pivotal means 62 is shown to include opposed annular wall members 150 and 152 which are in spaced relation to one another. Annular wall members 150 and 152 are rigidly connected at an upper portion of their circumference by end member 154, and at a lower portion of their circumference by cylindrical boss 156, both end member 154 and cylindrical boss 156 being integrally formed with annular wall members 150 and 152. The free end of cylindrical bore 156 includes threaded bore 158, sized for connection to threaded rod 76 in the case of pivotal means 62, and sized for connection to the threaded end of shaft member 74 in the case of pivotal means 64.

Located in a central region of annular wall members 150 and 152 are apertures 160a and 160b, apertures 160a and 160b being in alignment with one another and sized to rotatably receive and support shaft 162. Retaining rings 164a and 164b restrict the axial movement of shaft 162 with respect to annular wall members 150 and 152, thereby preventing the removal of shaft 162 from annular wall members 150 and 152 while permitting its rotation therein. In the region between annular wall members 150 and 152, shaft 162 includes threaded aperture 166, sized for engagement with threaded portion 58 on operating means 46 in the case of pivotal means 62, and sized for engagement with threaded portion 70 on clamp assembly 66 in the case of pivotal means 64.

The structure of pivotal means 62 and 64 described above provides a universal joint capable of arcuate movement in any direction by the simultaneous rotation about two perpendicular axes intersecting at a central point. Thus, the longitudinal axis of threaded aperture 166 and the longitudinal axis of shaft 162 are in perpendicular relation to one another and intersect at the central point of both. Rotation about the longitudinal axis of threaded aperture 166 is accomplished by the incremental rotation of the threaded aperture 166 of pivotal means 62 or 64 on either threaded portion 58 or threaded portion 70, respectively. Rotation about the longitudinal axis of shaft 162 is accomplished by the rotation of shaft 162 within apertures 160a and 160b. Thus, the combined rotation about the longitudinal axes of both threaded aperture 166 and shaft 162 permits the arcuate movement of pivotal means 62 and 64 in any spherical direction. The capability of pivotal means 62 and 64 to move universally enables operating means 46 to operate freely and easily in either an upward or downward direction without restriction or binding, and therefore provides for the fluid operation of hand control apparatus 10.

Figure 2:
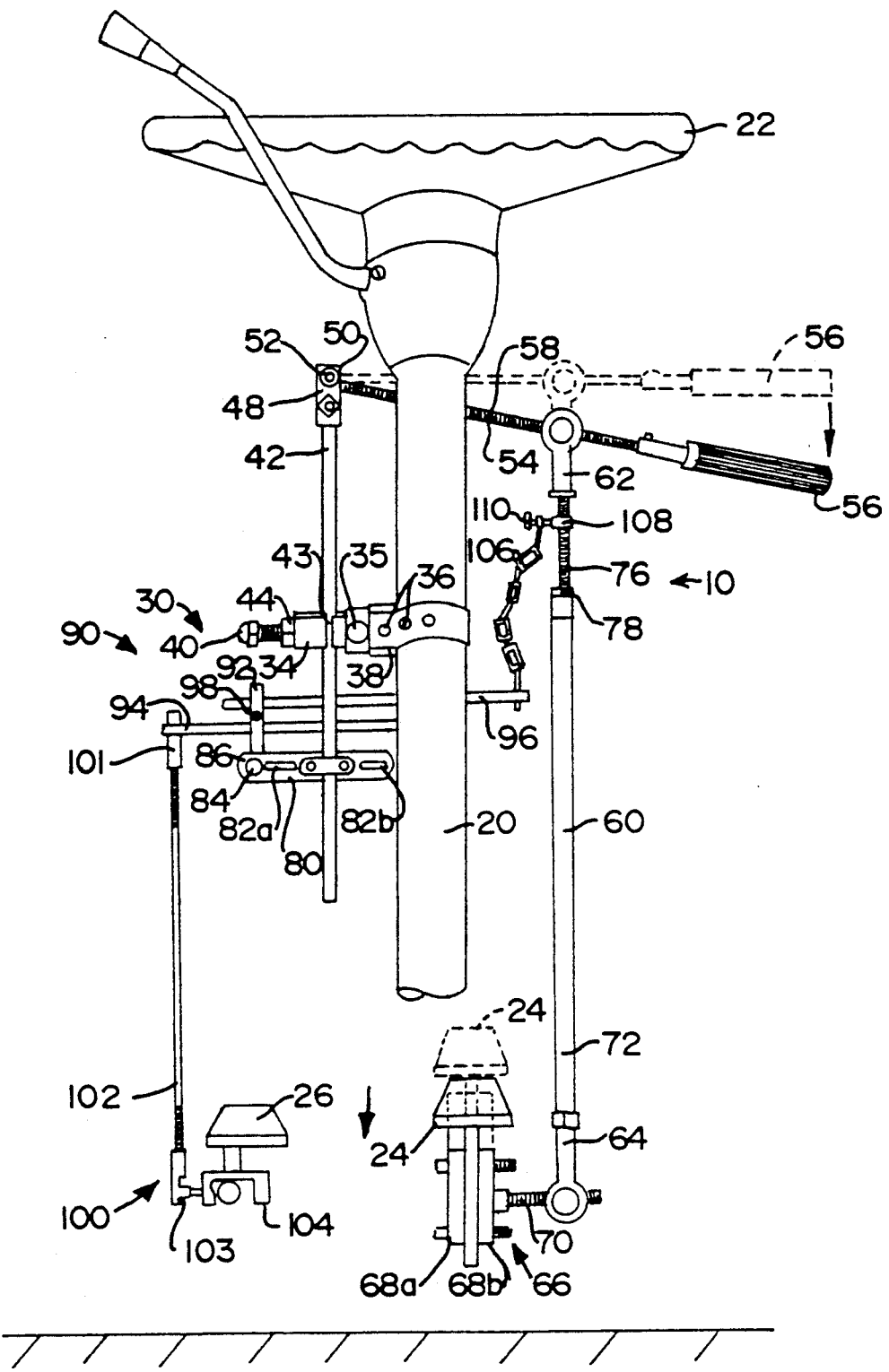
FIG. 2 is a perspective view showing the hand control apparatus of FIG. 1 in a first position of the motor vehicle; to operate the brake of the motor vehicle.

Operation of the hand control apparatus 10 can be more fully understood by reference to FIGS. 1–3. In FIG. 1, hand control apparatus 10 is shown in a normal or inoperative position such as one would find upon entering the motor vehicle. In this position, operating means 46 is substantially parallel with respect to the floor of the motor vehicle as are lever arms 94 and 96, and brake pedal 24 and accelerator pedal 26 are in their inoperative positions.

FIG. 2 shows the operation of hand control apparatus 10 in order to actuate the brake of the motor vehicle. Thus, operating means 46 is moved from the normal position shown by the phantomized lines downwardly, toward the floor of the motor vehicle as indicated. This causes telescoping means 60 to similarly move downward resulting in the displacement of brake pedal 24 as shown. The downward displacement of brake pedal 24 results in the application of a braking force in accordance with the normal operation of the brakes of a motor vehicle.

Now referring to FIG. 3, the operation of hand control apparatus 10 to actuate the accelerator of a motor vehicle is shown. Operating means 46 is moved from the normal position indicated by the phantomized lines or from a braking position as indicated in FIG. 2 upwardly, away from the floor of the motor vehicle. This action causes telescoping means 60 to move upwardly, thereby relieving any force exerted on brake pedal 24. Once brake pedal 24 has returned to its inoperative position as shown in FIG. 3, further upward movement of operating means 46 is permitted by the partial withdrawal of shaft member 74 from tubular sleeve 72.

As operating means 46 is moved upwards from the normal position a tension force is exerted on lost motion means 106 which causes lever means 90 to rotate in a counterclockwise direction from its normal inoperative position indicated by the phantomized lines. The upward rotation of lever arm 96 results in the downward rotation of lever arm 94, thereby causing threaded rod 102 to displace accelerator pedal 26 as indicated, actuating the throttle of the motor vehicle.

Returning operating means 46 from the throttle position shown in FIG. 3 to the normal position removes the tension from lost motion means 106, allowing accelerator pedal 26 to return to its inoperative position in accordance with the normal operation of the accelerator of a motor vehicle, and thereby returning lever means 90 to its inoperative position as shown in FIG. 1.

In installing hand control apparatus 10 in a motor vehicle, several adjustments are available. After longitudinally fixing the position of housing means 30 with respect to steering column 20, the position of fulcrum bar 42 is axially adjusted in order to properly locate the height of attachment block 48 and thereby fix the pivot point of operating means 46. This adjustment as well as the adjustment of the length of telescoping means 60 by further threading tubular sleeve 72 either onto or off from threaded rod 76 controls the clearance between steering wheel 22 and the operating range of operating means 46. Lowering the height of attachment block 48 and making telescoping means 60 shorter will increase the clearance, while raising the height of attachment block 48 and increasing the length of telescoping means 60 will reduce the clearance. Optimum adjustment will permit the user to comfortably actuate operating means 46 without interference with the steering wheel 22.

The leverage exerted upon brake pedal 24 by operating means 46 may be adjusted by the positioning of telescoping means 60. Under normal adjustment, telescoping means 60 is connected near the middle of operating means 46 so that it is substantially parallel to steering column 20. By moving the connection between telescoping means 60 and operating means 46 closer to attachment block 48, the leverage is increased making it easier to apply a braking force, but increasing the distance the operating means 46 will have to travel in order to actuate brake pedal 24. On the other hand, moving the connection between telescoping means 60 and operating means 46 closer to handle 56 decreases the leverage, making it more difficult to apply a braking force but decreasing the distance the operating means 46 will have to travel in order to actuate the brake pedal 24. Thus, by properly positioning the telescoping means 60, the operation of brake pedal 24 can be tailored for the comfort of the particular user. Furthermore, proper adjustment of the position of pivotal means 64 on threaded portion 70 of clamp assembly 66 ensures that telescoping means 60 will not interfere with the operation of brake pedal 24.

The operation of accelerator pedal 26 can also be adjusted in order to obtain the desired performance. The relative position of lever arms 94 and 96 to pivot point 84 determine the amount of leverage applied to actuate accelerator pedal 26. Sliding lever arm 96 toward telescoping means 60 in order to increase the distance between pivot point 84 and lost motion means 106 increases the leverage making it easier to operate the accelerator pedal 26, but also increases the distance that operating means 46 will have to travel in order to actuate the accelerator pedal 26. Moving lever arm 94 away from telescoping means 60 in order to increase the distance between pivot point 84 and threaded rod 102 decreases the leverage making it more difficult to operate the accelerator pedal 26, but also decreases the distance that operating means 46 must be moved in order to actuate accelerator pedal 26. The position of lever arm 94, however, must be such that the distance between pivot point 84 and accelerator actuating means 100 is sufficient to prevent accelerator actuating means 100 from interfering with the operation of accelerator pedal 26.

The distance that operating means 46 must be moved in order to actuate accelerator pedal 26 can further be adjusted by the position of annular collar 108 on threaded rod 76, a position closer to operating means 46 reducing the amount of travel necessary and a position farther from operating means 46 increasing the amount of travel necessary.

While the foregoing description presents the preferred embodiments of the apparatus in accordance with the present invention, it will be appreciated that certain changes and modifications may be made in the structure of these disclosed arrangements without departing from the, spirit and scope of the invention as set forth in the appended claims.

We claim:

1. Apparatus for operating the brake and accelerator of a motor vehicle by hand controls comprising,
   housing means for removably mounting said apparatus in assembled position on said motor vehicle,
   operating means having a distal end pivotally connected to said housing means and a proximate end including handle means movable in a first direction to operate the brake of the motor vehicle and movable in a second direction to release the brake and actuate the accelerator of the motor vehicle,
   telescoping means having a first pivotal means adjustably connectable and movable with the operating means on movement of the handle means, and a second pivotal means adjustable relative the first pivotal means for connection to the brake of the motor vehicle,
   lever means pivotally and adjustably connected to said housing means in spaced relation to said operating means,
   fulcrum bar means fixedly connected to said housing means and having a near end pivotally connected to said distal end of said operating means and a far end pivotally connected to said lever means,
   accelerator actuating means having a first end pivotally connected to said lever means and a second end adjustably spaced from said first end for attachment to the accelerator of the motor vehicle, and
   lost motion connecting means for operative connection to said telescoping means and said lever means for operating said accelerator actuating means only when said operating means moves said telescoping means in said second direction to release the brake of the motor vehicle.

2. An apparatus as claimed in claim 1 further including, positioning means for adjusting the transverse distance between said second pivotal means of said telescoping member and the brake of the motor vehicle.

3. An apparatus as claimed in claim 2 wherein said second pivotal means of said telescoping means comprises,
   first and second opposed wall members a spaced distance apart,
   said first wall member having a first bore therethrough in axial alignment with a second bore through said second wall member,
   an elongated boss member integrally connected at an edge of said first and second opposed wall members, and
   a cylindrical shaft rotatably mounted at one end in said first bore in said first wall member, and at another end in said second bore in said second wall member, said cylindrical shaft having a transverse bore therethrough at a location between said first and second wall members, and
   wherein said positioning means includes outer thread means and said transverse bore of said second pivotal means includes inner thread means sized and shaped for engagement with said outer thread means on said positioning means to enable adjustment of the transverse distance between said second pivotal means and the brake of the motor vehicle.

4. An apparatus as claimed in claim 1 wherein said operating means includes, means for adjusting said connection of said first pivotal means of said telescoping means on said operating means.

5. An apparatus as claimed in claim 1 wherein said telescoping means further includes means for adjusting the length of said telescoping means in order to adjust the operation of the brake of the motor vehicle.

6. An apparatus as claimed in claim 1 wherein said first pivotal means of said telescoping means comprises,
   first and second opposed wall members a spaced distance apart,
   said first wall member having a first bore therethrough in axial alignment with a second bore through said second wall member,
   an elongated boss member integrally connected at an edge of said first and second opposed wall member, and
   a cylindrical shaft rotatably mounted at one end in said first bore in said first wall member, and at another end in said second bore in said second wall member, said cylindrical shaft having a transverse bore therethrough at a location between said first and second wall members, and
   wherein said operating means includes outer thread means and said transverse bore of said first pivotal means includes inner thread means sized and shaped for engagement with said outer thread means on said operating means to enable adjustment of said connection of said first pivotal means on said operating means.

7. An apparatus as claimed in claim 1 wherein a force is applied to actuate the accelerator, and said lever means includes means for altering said force.

8. An apparatus as claimed in claim 7 wherein said lever means comprises,
   a first lever arm connected at a pivot point to said housing means, and having pivotally connected at an operative end thereof said first end of said accelerator actuating means, and
   means for altering the distance between said pivot point and said operative end of said lever arm in order to alter said force applied to actuate the accelerator.

9. An apparatus for operating the brake and accelerator of a motor vehicle by hand controls comprising,
   housing means for removably mounting said apparatus in assembled position on said motor vehicle,
   operating means having a distal end pivotally connected to said housing means and a proximate end including handle means movable in a first direction to operate the brake of the motor vehicle and movable in a second direction to release the brake and actuate the accelerator of the motor vehicle,
   telescoping means having a first pivotal means adjustably connectable and movable with the operating means on movement of the handle means, and a second pivotal means adjustable relative the first pivotal means for connection to the brake of the motor vehicle,
   lever means pivotally and adjustably connected to said housing means,
   accelerator actuating means having a first end pivotally connected to said lever means and a second end adjustably spaced from said first end for attachment to the accelerator of the motor vehicle,
   lost motion connecting means for operative connection to said telescoping means and said lever means for operating said accelerator actuating means only when said operating means moves said telescoping means in said second direction to release the brake of the motor vehicle, and
   fulcrum bar means fixably connected to said housing means and having a near end pivotally connected to said distal end of said operating means,
   wherein said telescoping means includes, collar means operatively connected to said telescoping means and longitudinally adjustable therealong and connected to said lost motion connecting means for adjusting the actuation of the accelerator of the motor vehicle upon movement of the handle means in said second direction.

10. An apparatus for operating the brake and accelerator of a motor vehicle by hand controls comprising,
    housing means for removably mounting said apparatus in assembled position on said motor vehicle,
    operating means having a distal end pivotally connected to said housing means and a proximate end including handle means movable in a first direction to operate the brake of the motor vehicle and movable in a second direction to release the brake and actuate the accelerator of the motor vehicle,
    telescoping means having a first pivotal means adjustably connectable and movable with the operating means on movement of the handle means, and a second pivotal means adjustable relative the first pivotal means for connection to the brake of the motor vehicle,
    lever means pivotally and adjustably connected to said housing means, said lever means including means for altering a force applied to actuate the accelerator,
    accelerator actuating means having a first end pivotally connected to said lever means and a second end adjustably spaced from said first end for attachment to the accelerator of the motor vehicle,
    lost motion connecting means for operative connection to said telescoping means and said lever means for operating said accelerator actuating means only when said operating means moves said telescoping means in said second direction to release the brake of the motor vehicle, and
    fulcrum bar means fixably connected to said housing means and having a near end pivotally connected to said distal end of said operating means,
    said lever means further including a first lever arm connected at a pivot point to said housing means, and having pivotally connected at an operative end thereof said first end of said accelerator actuating means, and means for altering the distance between said pivot point and said operative end of said lever arm in order to alter said force applied to actuate the accelerator, a second lever arm connected at said pivot point to said housing means, said second lever arm having an attachment end for connection with said loss motion connecting means, said attachment end of said second lever arm being spaced from said operative end of said first lever arm so that pivotal displacement of said first and second lever arms about said pivot point results in the tangential displacement of said attachment end of said second lever arm in a first vertical direction and a corresponding tangential displacement of said operative end of said first lever arm in an opposite vertical direction, and means for altering the distance between said pivot point and said attachment end of said second lever arm in order to alter said force applied to actuate the accelerator.

11. An apparatus for operating the brake and accelerator of a motor vehicle by hand controls comprising, housing means for removably mounting said apparatus in assembled position on said motor vehicle, operating means having a distal end pivotally connected to said housing means and a proximate end including handle means movable in a first direction to operate the brake of the motor vehicle and movable in a second direction to release the brake and actuate the accelerator of the motor vehicle, telescoping means having a first pivotal means adjustably connectable and movable with the operating means on movement of the handle means, and a second pivotal means adjustable relative the first pivotal means for connection to the brake of the motor vehicle, lever means pivotally and adjustably connected to said housing means, accelerator actuating means having a first end pivotally connected to said lever means and a second end adjustably spaced from said first end for attachment to the accelerator of the motor vehicle, a length of chain for operative connection to said telescoping means and said lever means for operating said accelerator actuating means only when said operating means moves said telescoping means in said second direction to release the brake of the motor vehicle, fulcrum bar means fixedly connected to said housing means and having a near end pivotally connected to said distal end of said operating means.

* * * * *

UNITED STATES PATENT AND TRADEMARK OFFICE
CERTIFICATE OF CORRECTION

PATENT NO. : 4,998,983
DATED : March 12, 1991
INVENTOR(S) : Peter B. Ruprecht, et al.

It is certified that error appears in the above-identified patent and that said Letters Patent is hereby corrected as shown below:

Column 3, lines 57 and 58, delete "of the motor vehicle;"

Column 5, line 64, delete ".of" and insert therefor --of--.

Signed and Sealed this

Eighteenth Day of August, 1992

*Attest:*

DOUGLAS B. COMER

*Attesting Officer*      *Acting Commissioner of Patents and Trademarks*